United States Patent
Lim et al.

(10) Patent No.: US 7,968,078 B2
(45) Date of Patent: Jun. 28, 2011

(54) METHOD OF PRODUCING HYDROGEN USING AMINO ACIDS

(75) Inventors: Myong Hoon Lim, Yongin (KR); Jae-Hun Rho, Yong (KR); Tae Hee Park, Seoul (KR); Jae Hoi Gu, Sungnam (KR); Yong Ho Yu, Seongnam (KR)

(73) Assignee: Samsung Engineering Co., Ltd., Gangnam-Gu, Seoul (KR)

( * ) Notice: Subject to any disclaimer, the term of this patent is extended or adjusted under 35 U.S.C. 154(b) by 864 days.

(21) Appl. No.: 11/979,803

(22) Filed: Nov. 8, 2007

(65) Prior Publication Data
US 2008/0118430 A1 May 22, 2008

(30) Foreign Application Priority Data
Nov. 20, 2006 (KR) .......................... 10-2006-0114660

(51) Int. Cl.
C01B 3/00 (2006.01)
(52) U.S. Cl. ............... 423/658.2; 423/644; 423/648.1
(58) Field of Classification Search ............ 423/644, 423/648.1, 658.2
See application file for complete search history.

(56) References Cited

U.S. PATENT DOCUMENTS

| | | | |
|---|---|---|---|
| 2,983,569 A * | 5/1961 | Kalopissis et al. | 132/204 |
| 6,534,033 B1 | 3/2003 | Amendola et al. | |
| 2005/0158596 A1 | 7/2005 | Linkous et al. | |
| 2008/0078977 A1 * | 4/2008 | Hashiba et al. | 252/500 |
| 2008/0256858 A1 * | 10/2008 | Fuller et al. | 48/174 |

OTHER PUBLICATIONS

Narasimhan et al., "Synthetic Applications of Zinc Borohydride." Aldrichimica Acta, vol. 31. No. 1, 1998.*
Yoshitsugu Kojima et al., "Hydrogen Generation Using Sodium Borohydride Solution and Metal Catalyst Coated on Metal Oxide" International Journal of Hydrogen Energy, 2002, vol. 27, pp. 1029-1034.
Clifford M. Kaufman et al., "Hydrogen Generation by Hydrolysis of Sodium Tetrahydroborate : Effects of Acids and Transition Metals and Their Salts" J. Chem. Soc Dalton Trans. 1985, pp. 307-313.

* cited by examiner

Primary Examiner — Jessica L Ward
Assistant Examiner — Paul A Wartalowicz
(74) Attorney, Agent, or Firm — Buchanan Ingersoll & Rooney PC

(57) ABSTRACT

Provided is a method of preparing hydrogen using an amino acid. The method of preparing hydrogen using an amino acid includes: (a) mixing a metal borohydride and a zwitterionic material; (b) adding a solvent thereto to dissolve the mixture; and (c) generating hydrogen from the solution. The provided method of preparing hydrogen using an amino acid can reduce manufacturing costs, reduce a heating value of hydrogen during hydrolysis, increase a hydrogen generation rate, and allow a hydrogen generating apparatus to be small in size.

9 Claims, 3 Drawing Sheets

METHOD OF PRODUCING HYDROGEN USING AMINO ACIDS

CROSS-REFERENCE TO RELATED PATENT APPLICATION

This application claims the benefit of Korean Patent Application No. 10-2006-0114660, filed on Nov. 20, 2006, in the Korean Intellectual Property Office, the disclosure of which is incorporated herein in its entirety by reference.

BACKGROUND OF THE INVENTION

1. Field of the Invention

The present invention relates to a method of preparing hydrogen using an amino acid, and more particularly, to a method of preparing hydrogen using an amino acid by which a heating value of hydrogen is reduced when being generated and a hydrogen generation rate is improved.

2. Description of the Related Art

Hydrogen gas, which is a future-oriented environmental-friendly form of providing energy, reacts with oxygen to produce energy and water as a byproduct. Therefore, hydrogen gas can solve a variety of environmental problems that are caused by use of fossil fuels, which are at present our main energy sources. In addition, hydrogen gas can be variously used in fuel cells, hydrogen engines, gas turbines, and the like, and thus much research into the preparation of hydrogen gas as an alternative energy source of fossil fuels has been actively conducted.

A technique for stably and effectively storing and supplying hydrogen is one of the most important techniques required, in terms of using hydrogen gas in a variety of commercial application fields. Recently, sodium borohydride has drawn much attention as a material which can be used to store and generate hydrogen. When a transition metal or a salt thereof is added to an aqueous sodium borohydride solution, borohydride is hydrolyzed, and thus hydrogen gas is generated (Kaufam, C. M. and Sen, B., J. Chem. Soc. Dalton Trans. 1985, 307-313).

U.S. Pat. No. 6,534,033 discloses a hydrogen generation system comprising a stabilized metal borohydride solution and a transition metal catalyst. Herein, not only does the metal borohydride solution function as a hydrogen storage source, but also functions as a catalyst system which releases hydrogen with the transition metal catalyst. Among transition metal catalysts, ruthenium, rhodium, and platinum catalyst have high activity for hydrogen generation at room temperature, however it is too expensive for the catalysts to be disposably used in various application fields.

According to Kojima, Y. et al., Int. J. Hydrogen Energy, 2002, 27, 1029-1034 that has recently been published, it was reported by Toyota Central R&D Laboratories, Inc. that a catalyst containing platinum and $LiCoO_2$ had high catalyst activity in hydrogen generation. However, such a hydrogen generation system still uses precious metals such as platinum, and incurs high manufacturing costs, thereby making it difficult to implement. In terms of practical use, there is a need for a catalyst which has excellent efficiency of hydrogen generation and is also inexpensive.

US2005/0158596 A1 that has recently been published discloses a method of generating hydrogen in an aqueous metal borohydride solution using an organic pigment as a catalyst. In this case, the activity of the organic pigment catalyst is relatively largely affected by pH, and it has also difficulty in fixation of the catalyst. Thus, application of the method in various fields is not easy.

As a method of generating hydrogen, a metal borohydride is hydrolyzed using a metal catalyst, an organic acid, or an inorganic acid (for example, acetic acid, sulfuric acid, and the like), generating a large amount of heat. If a large amount of heat generated is naturally cooled down, the cooling speed is so slow that there are large limitations on adjusting a hydrogen generation amount. Thus, there is a need for installing a cooling system such as a heat exchanger, and the like in a hydrogen generating apparatus. Accordingly, the total size of the hydrogen generating apparatus is required to be increased, and thus a large amount of heat generated is a big drawback in making the hydrogen generating apparatus small in size.

To address these problems, for small-sized hydrogen generating apparatuses, there is an urgent need to develop a method of generating a desired amount of hydrogen, which reduces manufacturing costs and lowers a heating value of hydrogen.

SUMMARY OF THE INVENTION

The present invention provides a method of preparing hydrogen, which can reduce manufacturing costs.

The present invention also provides a method of preparing hydrogen, which can reduce a heating value of the hydrogen during hydrolysis.

The present invention also provides a method of preparing hydrogen, which can increase a hydrogen generation rate.

The present invention also provides a method of preparing hydrogen, which can enable a hydrogen generating apparatus to be small in size.

According to an aspect of the present invention, there is provided a method of preparing hydrogen, comprising: (a) mixing a metal borohydride and a zwitterionic material; (b) adding a solvent thereto to dissolve the mixture; and (c) generating hydrogen from the solution.

In operation (a), a solid additive may be further added.

The solid additive may be at least one material selected from the group consisting of silica, ceramics, polymers, glass, fibers, fabrics, textiles, wovens, nonwovens, alloys, zeolites, molecular sieves, graphite, metal oxides, metal borides, and metal nitrides.

An amount of the solid additive added may be in the range of from 1,000 to 10,000 parts by volume based on 100 parts by volume of the solvent.

1 part by mole of the metal borohydride and 0.1 to 10 parts by mole of the zwitterionic material may be mixed.

The metal borohydride may be sodium borohydride.

The zwitterionic material is an amino acid.

The amino acid may be at least one selected from the group consisting of glycine, alanine, valine, leucine, isoleucine, threonine, serine, cysteine, methionine, aspartic acid, ornithine, asparagine, glutamic acid, lysine, arginine, histidine, phenylalanine, tyrosine, tryptophan, proline, and oxyproline.

The zwitterionic material may be betaines or ylides.

The solvent may be water or an organic solvent.

The organic solvent may be alcohol.

An amount of the solvent added may be in the range of from 100 to 10,000 parts by weight based on 100 parts by weight of the metal borohydride.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
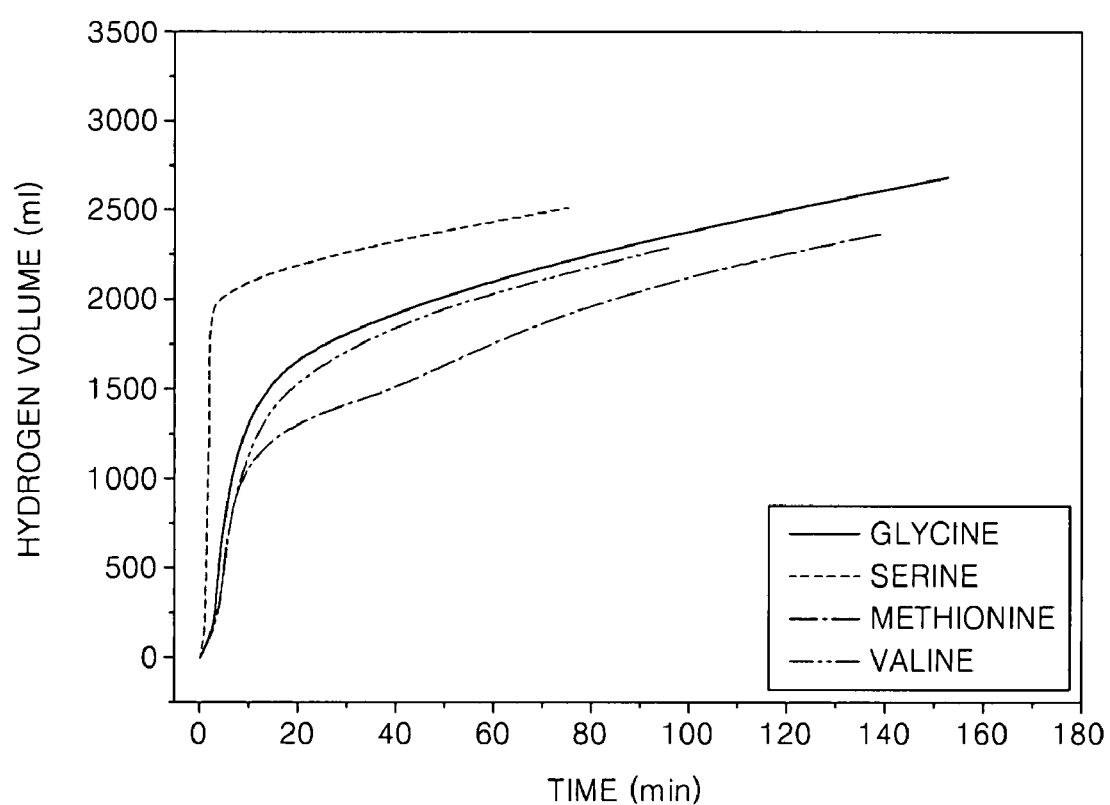
FIG. 1 is a graph showing a hydrogen generating amount according to time, wherein the hydrogen is generated by a method of preparing hydrogen, according to an embodiment of the present invention.

Hereinafter, the present invention will now be described more fully with reference to the accompanying drawings.

A method of preparing hydrogen, according to an embodiment of the present invention includes: mixing a metal borohydride and a zwitterionic material; adding a predetermined solvent thereto to dissolve the mixture; and generating hydrogen from the solution.

A metal borohydride may be used as the metal borohydride, but the present invention is not limited thereto.

The zwitterionic material simultaneously contains a cation and an anion, thereby having an electrically neutral property. Therefore, when the zwitterionic material is dissolved in a solvent and is bound to an ionic material, it functions as a bridge between the anion and the cation, and thus the zwitterionic material can affect electronic and magnetic properties between the two ions.

The zwitterionic material may be amino acids, betaines, or ylides. The amino acid which can be used in the present invention may be glycine, alanine, valine, leucine, isoleucine, threonine, serine, cysteine, methionine, aspartic acid, ornithine, asparagine, glutamic acid, lysine, arginine, histidine, phenylalanine, tyrosine, tryptophan, proline, oxyproline, or mixtures thereof.

In addition, the zwitterionic material does not function as a catalyst, and thus a relatively large amount of the zwitterionic material is used compared to the catalyst. However, when an amino acid which is inexpensive and has no toxicity is used as the zwitterionic material, it is economical, and it is environmental-friendly because produced byproducts are salts bound to the amino acid, which is not harmful.

The solvent dissolves the mixture of the metal borohydride and the zwitterionic material and subsequently generates hydrogen. The amount of the solvent added may be in the range of from 100 to 10,000 parts by weight, and preferably from 1,000 to 5,000 parts by weight based on 100 parts by weight of the metal borohydride. When the amount of the solvent added is less than 100 parts by weight based on 100 parts by weight of the metal borohydride, a certain amount of the metal borohydride is not dissolved. When the amount of the solvent added is greater than 10,000 parts by weight based on 100 parts by weight of the metal borohydride, the volume of a hydrogen generating apparatus is excessively increased. The solvent may be water, or an organic solvent such as alcohol, or the like.

When the metal borohydride is dissolved in the solvent, it is ionized, and thereby it is divided into a cation of the metal and an anion of borohydride. Subsequently, the zwitterionic material functions between the cation and the anion, and thus changes a hydrolysis rate of borohydride and a heating value of borohydride during hydrolysis. More particularly, the zwitterionic material accelerates the hydrolysis rate of borohydride and reduces the heating value of borohydride during hydrolysis.

In the mixture of the metal borohydride and the zwitterionic material, the amount of the zwitterionic material may be preferably in the range of from 0.1 to 10 parts by mole, and more preferably in the range of from 0.1 to 1 parts by mole based on 1 part by mole of the metal borohydride. When the amount of the zwitterionic material is less than 0.1 parts by mole based on 1 part by mole of the metal borohydride, the zwitterionic material hardly affects the hydrolysis rate of borohydride and the heating value of borohydride during hydrolysis. On the other hand, when the amount of the zwitterionic material is greater than 10 parts by mole based on 1 part by mole of the metal borohydride, the effect of the zwitterionic material on the hydrolysis rate of borohydride and the heating value of borohydride during hydrolysis is not increased, the amino acid is unnecessarily wasted, and the volume of the hydrogen generating apparatus is unnecessarily increased.

When the metal borohydride and the zwitterionic material are mixed, a solid additive may be mixed together. Not only does the solid additive accelerate the dissolution of the mixture of the metal borohydride and the zwitterionic material in the solvent, but also it helps a hydrogen gas generated when borohydride is hydrolyzed to be exhausted outward. The amount of the solid additive mixed may be in the range of from 1,000 to 10,000 parts by volume based on 100 parts by volume of the solvent. When the amount of the solid additive mixed is less than 1,000 parts by volume based on 100 parts by volume of the solvent, the effect of accelerating the dissolution of the mixture and the effect of exhausting of the hydrogen gas are insignificant. On the other hand, when the amount of the solid additive mixed is greater than 10,000 parts by volume based on 100 parts by volume of the solvent, the volume of the hydrogen generating apparatus is excessively increased. The amount of the solid additive may be appropriately adjusted depending on the size of the hydrogen generating apparatus, and the total weight of the metal borohydride, the zwitterionic material and the solvent used. The solid additive may be silica, ceramics, polymers, glass, fibers, fabrics, textiles, wovens, nonwovens, alloys, zeolites, molecular sieves, graphite, metal oxides, metal borides, metal nitrides, or mixtures thereof.

The present invention will now be described in more detail with reference to the examples below, but is not limited thereto. The following examples are for illustrative purposes only and are not intended to limit the scope of the invention.

EXAMPLES

Example 1

Test of Generating Hydrogen Using Glycine 1.99 g of glycine was added to a reactor in which 1 g of sodium borohydride ($NaBH_4$) was contained to obtain a mixing ratio of sodium borohydride to glycine (Sigma-Aldrich, powder product) of 2:1 (unit: mole) and then mixed. 10 ml of deionized water was added to the mixture to dissolve the mixture. Subsequently, when hydrogen gas was generated, the flowrate of the generated hydrogen gas was measured using a mass flow controller connected to a computer. The flowrate of the hydrogen gas reached a peak of 218 ml/min within 10 minutes after the reaction. Then, a constant flowrate of about 7 ml/min was maintained for about 2 hours. A conversion of sodium borohydride was 93.53%.

Example 2

Test of Generating Hydrogen Using Serine 1.39 g of serine was added to a reactor in which 1 g of sodium borohydride (NaBH$_4$) was contained to obtain a mixing ratio of sodium borohydride to serine (Sigma-Aldrich, powder product) of 2:1 (unit: mole) and then mixed. 10 ml of deionized water was added to the mixture to dissolve the mixture. Subsequently, when hydrogen gas was generated, the flowrate of the generated hydrogen gas was measured using a mass flow controller connected to a computer. The flowrate of the hydrogen gas reached a peak of 270 ml/min within 5 minutes after the reaction. Then, a constant flowrate of about 6.9 ml/min was maintained for about 1 hour. A conversion of sodium borohydride was 90.32%.

Example 3

Test of Generating Hydrogen Using Methionine 1.97 g of methionine was added to a reactor in which 1 g of sodium borohydride (NaBH$_4$) was contained to obtain a mixing ratio of sodium borohydride to methionine (Sigma-Aldrich, powder product) of 2:1 (unit: mole) and then mixed. 10 ml of deionized water was added to the mixture to dissolve the mixture. Subsequently, when hydrogen gas was generated, the flowrate of the generated hydrogen gas was measured using a mass flow controller connected to a computer. The flowrate of the hydrogen gas reached a peak of 240 ml/min within 10 minutes after the reaction. Then, a constant flowrate of about 9.32 ml/min was maintained for about 2 hours. A conversion of sodium borohydride was 88.74%.

Example 4

Test of Generating Hydrogen Using Valine 1.55 g of valine was added to a reactor in which 1 g of sodium borohydride (NaBH$_4$) was contained to obtain a mixing ratio of sodium borohydride to valine (Sigma-Aldrich, powder product) of 2:1 (unit: mole) and then mixed. 10 ml of deionized water was added to the mixture to dissolve the mixture. Subsequently, when hydrogen gas was generated, the flowrate of the generated hydrogen gas was measured using a mass flow controller connected to a computer. The flowrate of the hydrogen gas reached a peak of 182 ml/min within 5 minutes after the reaction. Then, a constant flowrate of about 0.95 ml/min was maintained for about 1 hour. A conversion of sodium borohydride was 87.39%.

Figure 2:
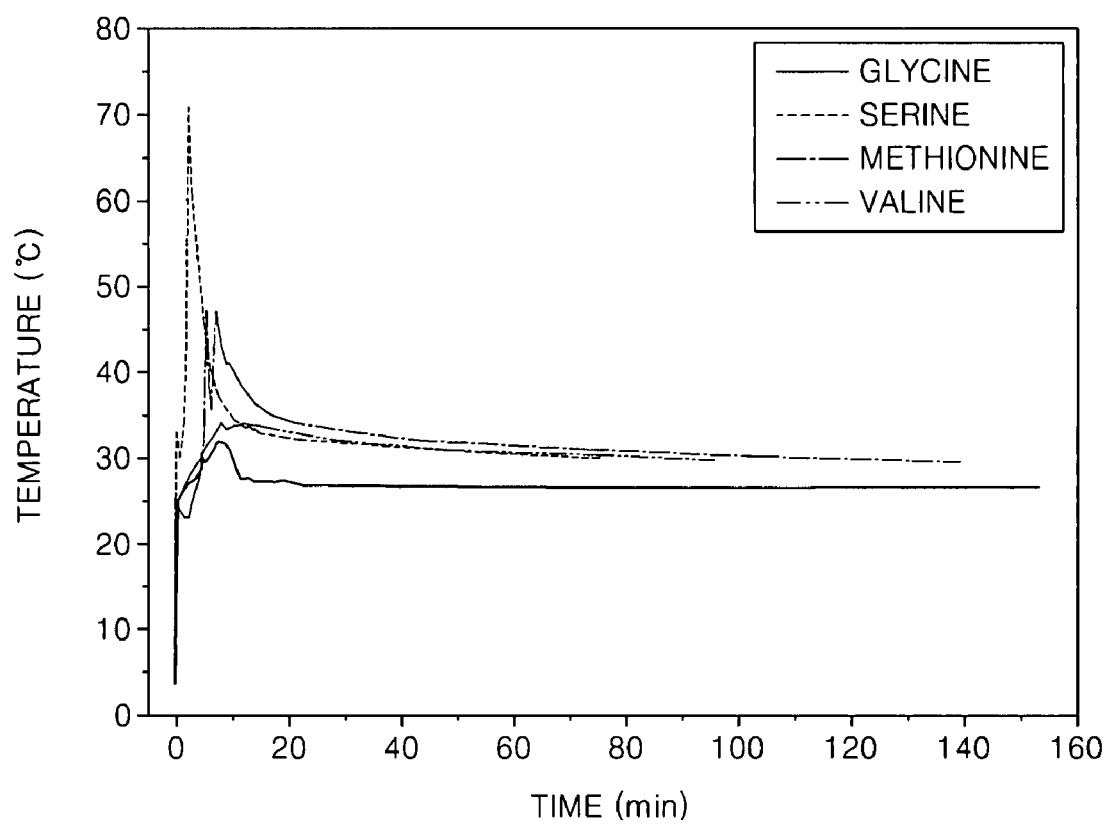
FIG. 2 is a graph showing a change in reaction temperature according to time when the hydrogen is generated by a method of preparing hydrogen, according to an embodiment of the present invention.
Figure 3:
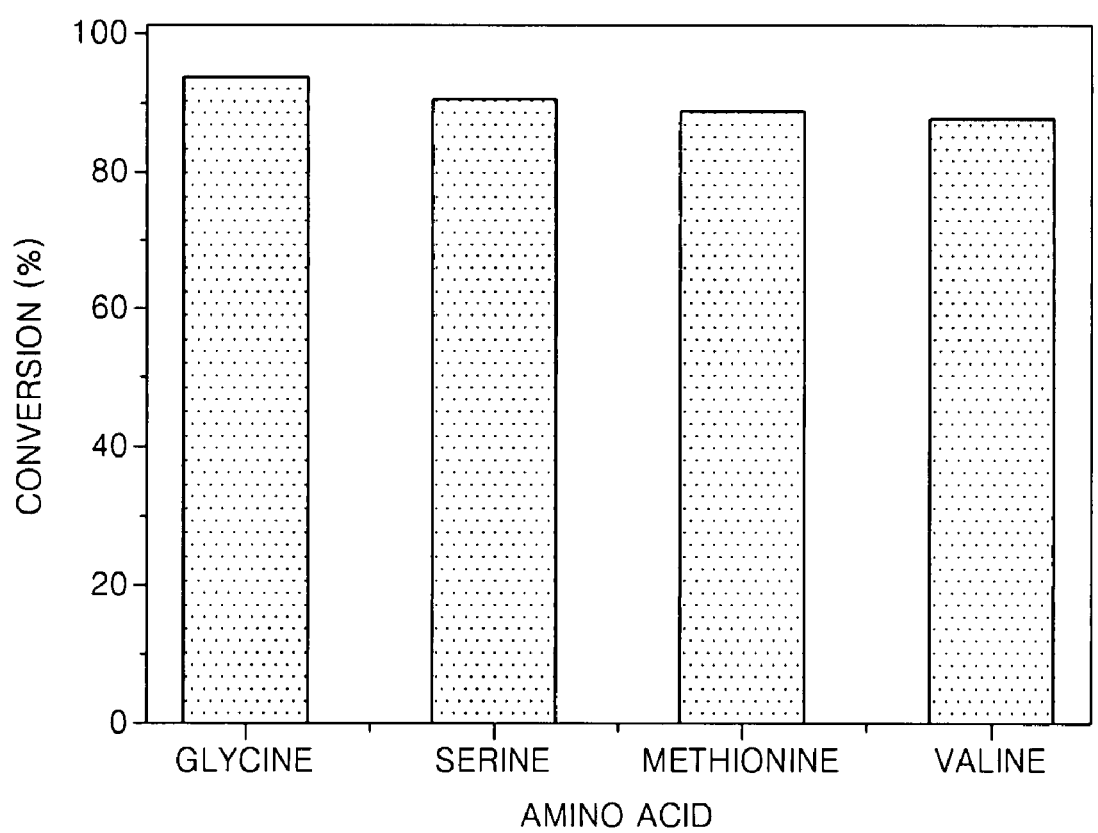
FIG. 3 is a graph showing the conversion of a metal borohydride among reactants when the hydrogen is generated by a method of preparing hydrogen, according to an embodiment of the present invention.

The test results of hydrogen generation are shown in FIGS. 1 through 3.

FIG. 1 is a graph showing a hydrogen generating amount according to time, wherein the hydrogen is generated by a method of preparing hydrogen according to an embodiment of the present invention.

Referring to FIG. 1, a generating amount of hydrogen gas rapidly increases in early stage of the reaction (prior to about 5 minutes or 10 minutes after the reaction) and then slowly increases thereafter. In the case of serine having a hydroxyl group (OH) which is a hydrophilic group, a hydrogen generation rate is fast. On the other hand, in the case of valine or methionine which has a hydrophoboic group, a hydrogen generation rate is slow. In addition, in the case of glycine which does not have both a hydrophilic group and a hydrophobic group, a hydrogen generation rate is moderate.

FIG. 2 is a graph showing a change in reaction temperature according to time when the hydrogen is generated by a method of preparing hydrogen, according to an embodiment of the present invention.

Referring to FIG. 2, in the case of the three types of amino acids except for serine, a maximum reaction temperature when sodium borohydride is hydrolyzed is less than 50° C. However, in the case of serine, a reaction temperature is increased up to maximum 70° C. It is regarded that this is because serine has a hydrophilic group, and thus close interaction between the amino acid and borohydride ions occurs. In the case of glycine, a maximum reaction temperature when sodium borohydride is hydrolyzed is less than 35° C. Thus, when a hydrogen generating apparatus using glycine is designed, there is no need for a separate heat exchanger, and this can allow the hydrogen generating apparatus to be small in size. In the case of a conventional method of hydrolyzing sodium borohydride using a catalyst, a reaction temperature of about 90° C. is generally maintained at atmospheric pressure. Therefore, using the amino acids when sodium borohydride is hydrolyzed, the reaction speed can be increased and the heating value can also be significantly reduced.

FIG. 3 is a graph showing the conversion of a metal borohydride among reactants when hydrogen is generated by a method of preparing hydrogen according to an embodiment of the present invention.

Referring to FIG. 3, glycine has the highest conversion of 93.53%, and the other types of the amino acids also have a conversion of 87% or more. From the results, it can be seen that the method of preparing hydrogen using amino acids is effective.

In summary, in the method of preparing hydrogen, according to the present invention, a zwitterionic material such as amino acids, or the like is used without using a separate catalyst. Therefore, using the method, a conversion which is almost the same as that of a conventional method of preparing hydrogen can be maintained, the hydrogen generation rate can be increased, and the heating value of hydrogen can be reduced. In addition, the method of the present invention reduces manufacturing costs of hydrogen gas, and allows the hydrogen generating apparatus to be small in size.

According to the present invention, a method of preparing hydrogen, which can reduce manufacturing costs is provided.

In addition, according to the present invention, a method of preparing hydrogen, which can reduce a heating value of the hydrogen during hydrolysis is provided.

In addition, according to the present invention, a method of preparing hydrogen, which can increase a hydrogen generation rate is provided.

In addition, according to the present invention, a method of preparing hydrogen, which can allow a hydrogen generating apparatus to be small in size is provided.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of preparing hydrogen, comprising:
   (a) mixing a metal borohydride and a zwitterionic material;
   (b) adding a solvent thereto to dissolve the mixture; and
   (c) generating hydrogen from the solution;
   wherein the zwitterionic material is betaines or ylides.

2. The method of claim 1, wherein 1 part by mole of the metal borohydride and 0.1 to 10 parts by mole of the zwitterionic material are mixed.

3. The method of claim 1, wherein the metal borohydride is sodium borohydride.

4. The method of claim 1, wherein an amount of the solvent added is in the range of from 100 to 10,000 parts by weight based on 100 parts by weight of the metal borohydride.

5. The method of claim 1, wherein in operation (a), a solid additive is further added.

6. The method of claim 5, wherein the solid additive is at least one material selected from the group consisting of silica, ceramics, polymers, glass, fibers, fabrics, textiles, wovens, nonwovens, alloys, zeolites, molecular sieves, graphite, metal oxides, metal borides, and metal nitrides.

7. The method of claim 5, wherein an amount of the solid additive is in the range of from 1,000 parts by volume to 10,000 parts by volume based on 100 parts by weight of the solvent.

8. The method of claim 1, wherein the solvent is water or an organic solvent.

9. The method of claim 8, wherein the organic solvent is alcohol.

\* \* \* \* \*

UNITED STATES PATENT AND TRADEMARK OFFICE
CERTIFICATE OF CORRECTION

PATENT NO.         : 7,968,078 B2
APPLICATION NO.    : 11/979803
DATED              : June 28, 2011
INVENTOR(S)        : Lim et al.

Page 1 of 1

It is certified that error appears in the above-identified patent and that said Letters Patent is hereby corrected as shown below:

On the Front Page, at Item (75) Inventors, please correct the spelling of Inventor Jae-Eun Rho's name, wherein "Jae-Hun" should be changed to --Jae-Eun--.

Signed and Sealed this
Fourteenth Day of February, 2012

David J. Kappos
*Director of the United States Patent and Trademark Office*